US011418014B2

(12) United States Patent
Scheckelhoff et al.

(10) Patent No.: US 11,418,014 B2
(45) Date of Patent: Aug. 16, 2022

(54) RETRACTABLE DIN CLIP

(71) Applicants: Robert Scheckelhoff, Perrysburg, OH (US); Paul Scott Buskey, Waterville, OH (US); Joseph Brown, Waterville, OH (US); Timothy Joseph Brakefield, Maumee, OH (US)

(72) Inventors: Robert Scheckelhoff, Perrysburg, OH (US); Paul Scott Buskey, Waterville, OH (US); Joseph Brown, Waterville, OH (US); Timothy Joseph Brakefield, Maumee, OH (US)

(73) Assignee: Regal Beloit America, Inc., Beloit, WI (US)

( * ) Notice: Subject to any disclaimer, the term of this patent is extended or adjusted under 35 U.S.C. 154(b) by 237 days.

(21) Appl. No.: 16/888,682

(22) Filed: May 30, 2020

(65) Prior Publication Data
US 2021/0376576 A1 Dec. 2, 2021

(51) Int. Cl.
*H02B 1/052* (2006.01)
(52) U.S. Cl.
CPC .................... *H02B 1/052* (2013.01)
(58) Field of Classification Search
CPC .... H02B 1/052; H02B 1/0523; H01R 9/2608; H01R 9/26; H01R 13/506; H05K 7/1474
See application file for complete search history.

(56) References Cited

U.S. PATENT DOCUMENTS

| | | | | |
|---|---|---|---|---|
| 4,268,108 A * | 5/1981 | Debaigt | ............... | H01R 9/2608 439/716 |
| 5,049,094 A * | 9/1991 | Heng | .................... | H02B 1/052 439/94 |
| 5,392,196 A * | 2/1995 | Kinner | ................... | H02B 1/052 361/752 |
| 5,480,310 A * | 1/1996 | Baum | ................... | H01R 9/2691 439/94 |
| 5,602,363 A * | 2/1997 | Von Arx | ................ | H02B 1/052 174/559 |
| 5,704,805 A * | 1/1998 | Douty | .................. | H01R 25/142 439/716 |
| 5,904,592 A * | 5/1999 | Baran | ................... | H02B 1/052 361/627 |
| 6,293,820 B1 * | 9/2001 | Bechaz | .................. | H02B 1/052 439/716 |
| 6,431,909 B1 * | 8/2002 | Nolden | ................ | H01R 9/2608 361/810 |

(Continued)

*Primary Examiner* — Patrick D Hawn
(74) *Attorney, Agent, or Firm* — Reinhart Boerner Van Deuren P.C.

(57) ABSTRACT

A DIN clip apparatus with a housing in which components are disposed. The housing has a bottom edge which abuts the DIN rail when the apparatus is mounted thereon. A DIN clip is attached to the bottom edge of the housing. The DIN clip includes a DIN clip body that is disposed to a first side of a DIN rail. The DIN clip body has a first end which is closest to the DIN rail, and a second end which is farthest from the DIN rail. A DIN clip arm is pivotally attached to the first end of the DIN clip body. The DIN clip arm is configured to span the width of the DIN rail and to pivotally transition between locked and unlocked positions. The DIN clip arm is configured to attach to a second side of the DIN rail opposite the first side, when in the locked position.

22 Claims, 4 Drawing Sheets

(56) References Cited

U.S. PATENT DOCUMENTS

| | | | | |
|---|---|---|---|---|
| 7,073,971 B2* | 7/2006 | Schurr | H05K 7/1474 | 439/94 |
| 7,516,927 B2* | 4/2009 | Portal | H01R 9/2608 | 248/222.12 |
| 7,704,102 B2* | 4/2010 | Nad | H01R 9/26 | 439/94 |
| 7,758,368 B2 | 7/2010 | Schelonka et al. | | |
| 7,922,521 B1* | 4/2011 | Wu | H01R 9/2691 | 439/532 |
| 8,062,061 B2* | 11/2011 | Lim | H02B 1/052 | 439/716 |
| 9,353,777 B2* | 5/2016 | Eminovic | H02B 1/052 | |
| 9,374,924 B2 | 7/2016 | Boretti | | |
| 9,386,718 B2 | 7/2016 | Kusumi et al. | | |
| 9,485,879 B2* | 11/2016 | Molnar | H05K 5/0026 | |
| 9,653,891 B2 | 5/2017 | V et al. | | |
| 10,411,372 B2* | 9/2019 | Kang | H02B 1/0526 | |
| 10,476,241 B2* | 11/2019 | Azuma | H02B 1/0523 | |
| 10,622,177 B2* | 4/2020 | Roth | H01R 9/2633 | |
| 10,798,842 B1* | 10/2020 | Wen | H02B 1/0523 | |
| 11,139,136 B1* | 10/2021 | Scheckelhoff | H01H 85/205 | |
| 2010/0255713 A1* | 10/2010 | Peng | H02B 1/052 | 439/532 |
| 2013/0023150 A1* | 1/2013 | von zur Muehlen | H01H 85/202 | 439/620.26 |
| 2013/0316552 A1* | 11/2013 | Sasano | H01R 9/2608 | 439/122 |
| 2014/0139976 A1* | 5/2014 | Santoni | F16B 1/00 | 361/605 |
| 2014/0199864 A1* | 7/2014 | Devanand | H01R 9/2608 | 439/116 |
| 2014/0226287 A1* | 8/2014 | V | H02B 1/052 | 361/747 |
| 2014/0357117 A1* | 12/2014 | Deshpande | H01R 9/2616 | 439/532 |
| 2016/0021776 A1* | 1/2016 | Ho | H02B 1/0523 | 248/231.31 |
| 2019/0350093 A1* | 11/2019 | Lin | F16B 5/121 | |

* cited by examiner

RETRACTABLE DIN CLIP

FIELD OF THE INVENTION

The present invention relates generally to an apparatus for mounting electrical and/or mechanical devices to DIN rails.

BACKGROUND OF THE INVENTION

There are a variety of electrical, mechanical, and electromechanical devices which can be mounted to a DIN rail. A DIN rail is a rail, typically made of metal, with defined dimensions widely used for mounting electrical components inside equipment racks or at other locations. DIN rails are standardized by the German national standards organization. In some cases, the DIN rail is elongate having a rail or track that may be bolted or otherwise mounted to a planar surface. One or more electrical and electromechanical devices may then be mounted onto the DIN rail. A DIN rail may permit a user to move a mounted device along the DIN rail or even remove the mounted device entirely from the DIN rail.

One current DIN rail mounting method is disclosed in U.S. Pat. No. 7,758,368. This patent discloses a DIN rail mount in which the device is securely fastened to a DIN rail, but which does not allow devices connected to a busbar to be as easily removed as desired by some users. Other DIN rail mounts are disclosed in U.S. Pat. Nos. 9,386,718, 9,374,924, and 9,653,891. The teachings and disclosures of the aforementioned four patents are incorporated herein by reference in their entireties.

In many conventional DIN rail mounts, the DIN rail includes some type of latch that engages one side of the DIN rail and another flexible or spring-loaded latch that engages the other side of the DIN rail. Thus, when a user wants to remove an electrical device, for example, from the DIN rail, the user needs to operate a latch or a lever to disengage the locking feature. This may be accomplished by pulling or pressing the latch or lever with one hand, while using the other hand to remove the device from the DIN rail. In some cases, the user has to use a tool such as a screwdriver to disengage the locking feature. Additionally, conventional DIN rail mounts have locking features that include an excessive number of parts, such that the locking feature is costly and difficult to manufacture.

In one exemplary application, an electrical device is mounted to a DIN rail while also being connected to a bus bar. With conventional DIN rail mounts, the bus bar prevents any upwards removal of the product from the DIN rail. This may present a servicing issue for operators trying to replace parts in the field. For example, to service such an electrical device in the middle of a DIN rail, all other outside components on the DIN rail would have to be disconnected and removed beforehand. This is a lengthy, inefficient process that negatively impacts the operator.

It would therefore be desirable to have a DIN rail mounting device that allows a device that could be easily mounted and dismounted relative to the DIN rail. Embodiments of the present invention address certain of the aforementioned problems with DIN rail mounts. These and other advantages of the invention, as well as additional inventive features, will be apparent from the description of the invention provided herein

BRIEF SUMMARY OF THE INVENTION

In one aspect, embodiments of the invention provide an apparatus configured for mounting onto a DIN rail. The apparatus includes a housing in which electrical, mechanical or electromechanical components are disposed. The housing has a bottom edge which abuts the DIN rail when the apparatus is mounted on the DIN rail. A DIN clip is attached to the bottom edge of the housing. The DIN clip includes a DIN clip body configured to be disposed to a first side of a DIN rail. The DIN clip body has a first end which is closest to the first side of the DIN rail, and a second end which is farthest from the first side of the DIN rail. A DIN clip arm is pivotally attached to the first end of the DIN clip body. The DIN clip arm is configured to span the width of the DIN rail and to pivotally transition between locked and unlocked positions. The DIN clip arm is configured to attach to a second side of the DIN rail opposite the first side, when in the locked position.

In a particular embodiment, a first end of the DIN clip arm is pivotally attached to the first end of the DIN clip body, and a second end of the DIN clip arm is hook-shaped. The second end of the DIN clip arm may be configured to latch onto the second side of the DIN rail. In some embodiments, the hook-shaped portion of the DIN clip arm is configured to partially surround a flange on the second side of the DIN rail. Additionally, the housing may include a first slot, and the DIN clip body may be disposed within the first slot and designed to move back and forth within the first slot between a locked position and an unlocked position.

In some embodiments, the first slot includes a first projection configured to engage a second projection on a surface of the DIN clip body when the DIN clip body moves back and forth within the first slot between the locked position and unlocked positions. The first slot may be located in a portion of the housing that depends from the bottom edge. In certain embodiments, the housing includes an angled slot, the DIN clip body being disposed within the first slot and designed to move back and forth within the first slot between a locked position and an unlocked position.

In more particular embodiments, the DIN clip arm includes a knob-like feature configured to move back and forth within an angled slot in the housing of the apparatus. For example, moving the housing in a first direction may cause the knob-like feature to move within the angled slot and raise the DIN clip arm into the unlocked position in which the DIN clip arm does not engage the DIN rail. In a further embodiment, the first direction is perpendicular to a length of the DIN rail and horizontal with respect to a mounting surface of the DIN rail.

Continuing with this example, moving the housing in a second direction opposite the first direction causes the knob-like feature to move within the angled slot and lower the DIN clip arm into the locked position in which the DIN clip arm engages the DIN rail. In this embodiments, the second direction is perpendicular to a length of the DIN rail and horizontal with respect to a mounting surface of the DIN rail. In certain particular embodiments the aforementioned apparatus is a fuse holder.

In another aspect, embodiments of the invention provide a DIN clip that includes a DIN clip body configured to be disposed to a first side of a DIN rail. The DIN clip body has a first end which is closest to the first side of the DIN rail, and a second end which is farthest from the first side of the DIN rail. A DIN clip arm is pivotally attached to the first end of the DIN clip body. The DIN clip arm is configured to span the width of the DIN rail and to pivotally transition between locked and unlocked positions. The DIN clip arm is also configured to attach to a second side of the DIN rail opposite the first side, when in the locked position.

In a particular embodiment, a first end of the DIN clip arm is pivotally attached to the first end of the DIN clip body, and a second end of the DIN clip arm is hook-shaped. The second end of the DIN clip arm may be configured to latch onto the second side of the DIN rail. In a further embodiment, the DIN clip body includes a projection configured to engage a corresponding projection on a device to which the DIN clip is attached. In certain embodiments, the DIN clip arm includes a knob-like feature configured to move back and forth within a slot in a device to which the DIN clip is attached. In more particular embodiments, the aforementioned device is a fuse holder.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

An embodiment of the present invention is illustrated in the figures as a retractable DIN clip with an arm that travels up and away from the DIN rail, so the product can be perpendicularly removed from the DIN rail without having to lift upwards. While the retractable DIN clip is most often shown in use with an exemplary fuse holder, those of ordinary skill in the art will recognize that the scope of the invention as claimed is not limited to applications involving fuse holders. Rather, embodiments of the retractable DIN clip can be used with any device suitable for mounting on a DIN rail.

Figure 1:
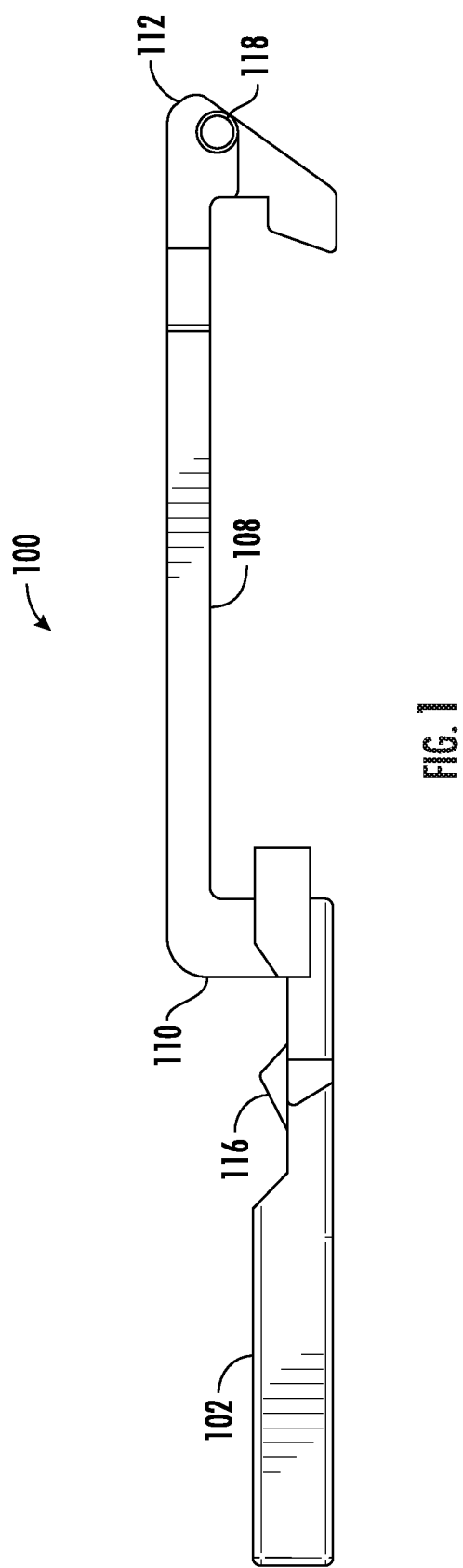
FIG. 1 is a side view of the retractable DIN clip in accordance with an embodiment of the present invention.
Figure 3:
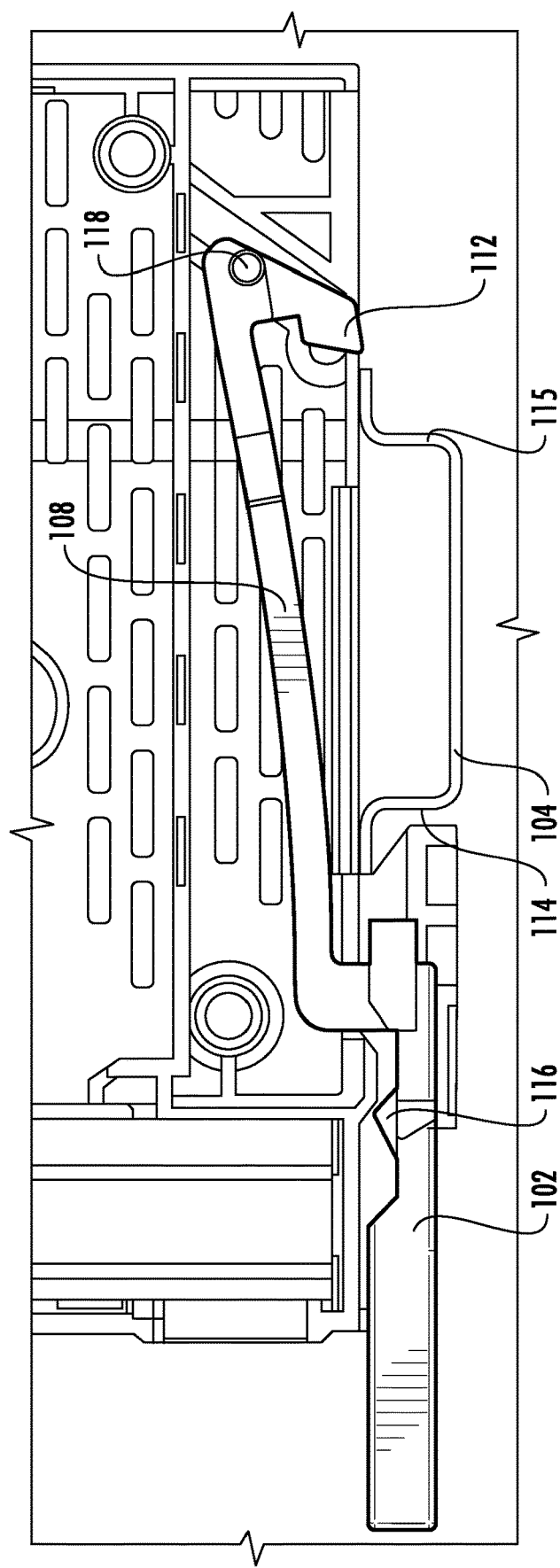
FIG. 3 is a side view of an exemplary fuse holder with the attached retractable DIN clip in the unlocked position, according to an embodiment of the invention.
Figure 4:
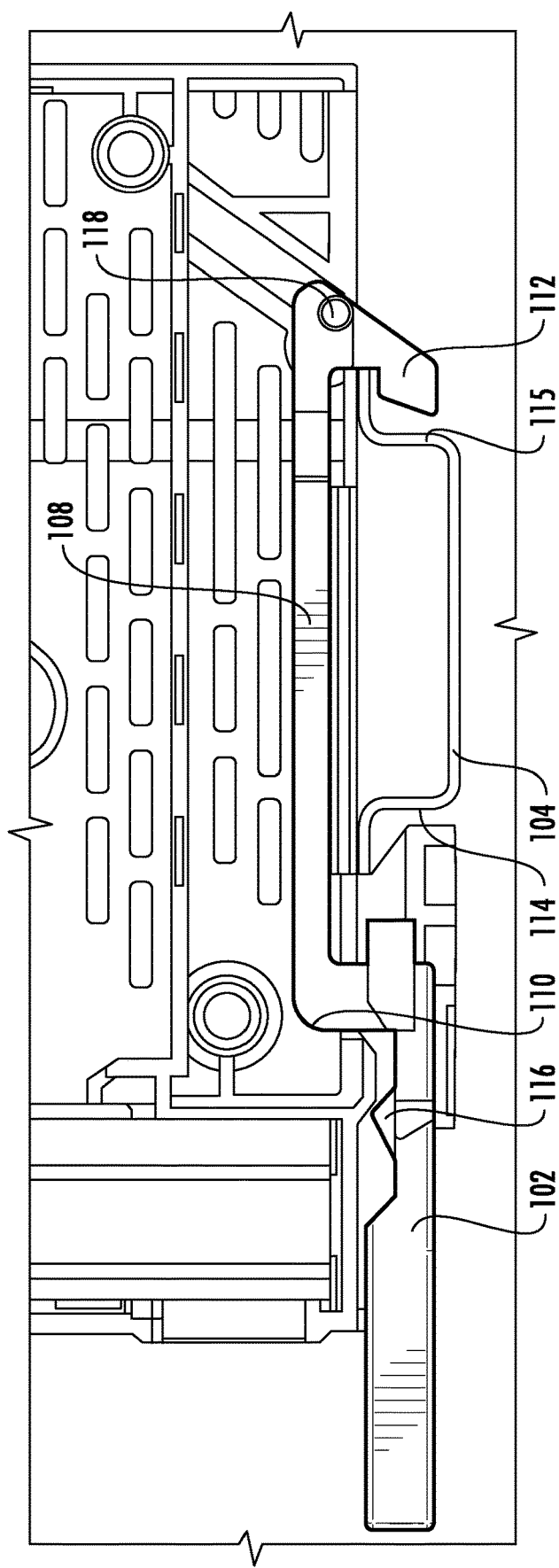
FIG. 4 is a side view of an exemplary fuse holder with the attached retractable DIN clip in the locked position, according to an embodiment of the invention.

FIG. 1 shows a side view of the retractable DIN clip 100, according to an embodiment of the invention. The DIN clip 100 includes a DIN clip body 102. The DIN clip body 102 is designed to be attached to the bottom of a device 106, for example an electrical or electromechanical device, and to a first side 114 of the DIN rail 104 (shown in FIGS. 3 and 4) to which the device 106 is mounted. Device 106 has a housing 107 which houses the electrical and/or mechanical components of the device 106.

In the embodiments shown, the DIN rail 104 has a central U-shaped portion along with two outward-projecting flanges on each side of the U-shaped portion. In the embodiment shown, the DIN clip body 102 is elongate with a first end that is closest to the first side 114 of the DIN rail 104 of any portion of the DIN clip body 102. The second end of the DIN clip body 102 is farthest from the first side 114 of the DIN rail 104.

A DIN clip arm 108 has a first end 110 that is pivotally attached to the aforementioned first end of the DIN clip body 102. The DIN clip arm 108 has a second hooked end 112 that is designed to engage the second side 115 of the DIN rail 104 opposite the first side 114. The DIN clip arm 108 spans the width of the DIN rail 104, and pivotally transitions between the locked and unlocked positions. More specifically, when the DIN clip arm 108 is in the locked position, the second hooked end 112 latches onto the second side 115 of the DIN rail 104 and at least partially surrounds a flange on the second side 115 of the DIN rail 104.

The DIN clip body 102 and DIN clip arm 108 each have a snap feature that facilitates locking and unlocking of the DIN clip 100 during use. The DIN clip body 102 has a raised portion 116 that rises vertically from a top surface of the DIN clip body 102 when it is attached to the bottom of the device 106. The DIN clip arm 108 has a knob-like projection, referred to herein as the knob 118 which projects out laterally from the DIN clip arm 108.

Figure 2:
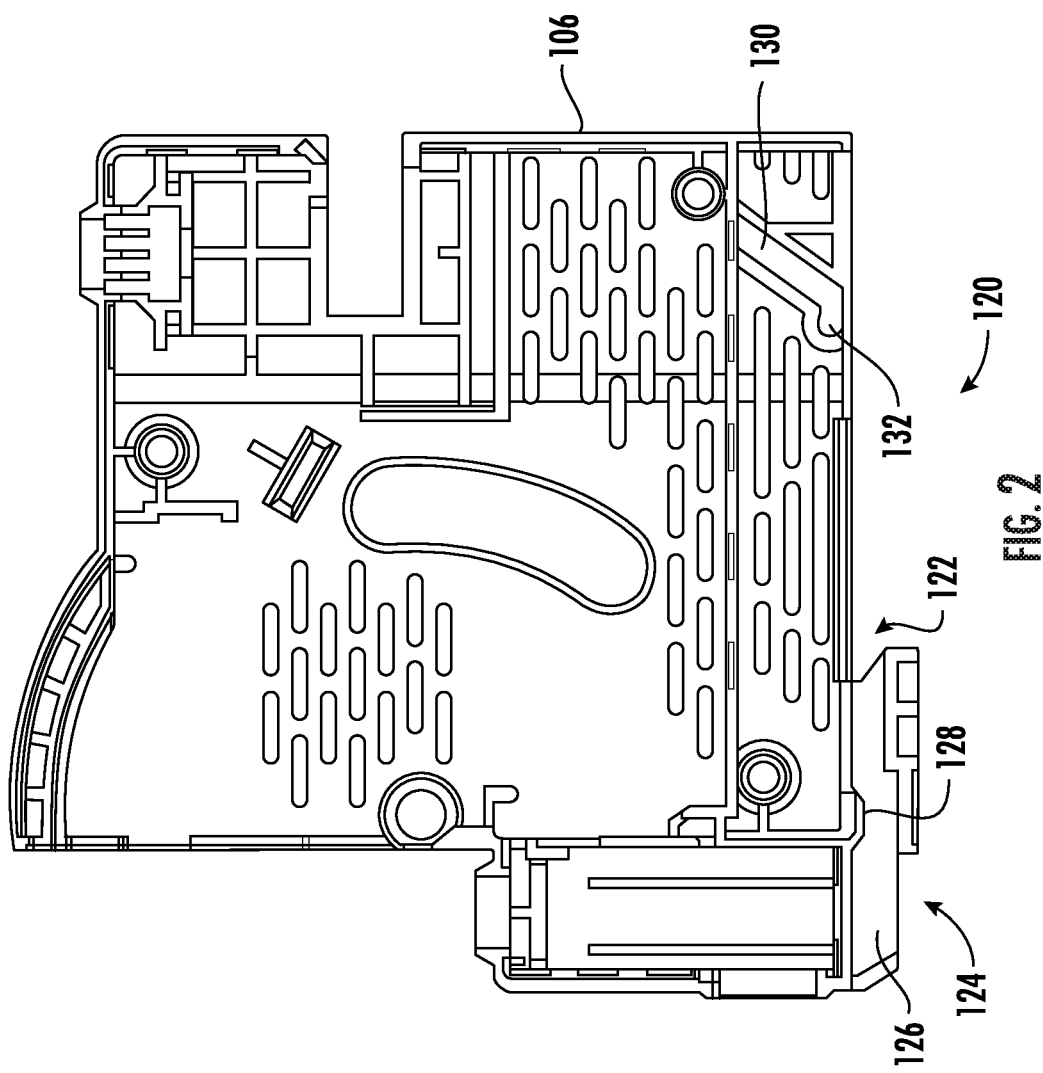
FIG. 2 is a side view of an exemplary fuse holder configured to incorporate the DIN clip of FIG. 1.

FIG. 2 is a side view of the device 106, which in the embodiment of FIG. 2 is a fuse holder 106 configured to incorporate the DIN clip 100. The fuse holder 106 has a bottom portion or bottom edge 120 of the housing 107 configured for attachment to the DIN clip 100. In the embodiment shown, the bottom portion 120 abuts the DIN rail 104 when the device 106 is mounted on the DIN rail 104. Also, the bottom portion 120 includes a notched section 122 that engages the aforementioned first side 114 of the DIN rail 104.

In the embodiment shown, the bottom portion 120 of fuse holder 106 includes a depending portion 124 that hangs below a bottom surface of the fuse holder housing 107. The depending portion 124 includes a first slot 126 which accommodates the DIN clip body 102, which in operation would slide back and forth within the first slot 126 during locking and unlocking procedures.

Within the first slot 126, there is a downward projection 128, which engages the raised portion 116 of the DIN clip body 102 to fix the position of the DIN clip 100 during locking and unlocking procedures. The fuse holder 106 also includes a second slot 130 at the bottom portion 120 of the housing 107. The second slot 130 is configured to accommodate the knob 118 of the DIN clip arm 108.

In operation, the knob 118 slide back and forth within second slot 130 during locking and unlocking procedures. In the embodiment of FIG. 2, the second slot 130 has a bottom-most section 132 which is where the knob 118 is positioned when the DIN clip 100 is locked in position on the DIN rail 104. From the bottom-most section 132, second slot 130 angles upward, such that, during unlocking of the DIN clip 100, the knob 118 moves up this angled portion of the second slot 130. As a result, the DIN clip arm 108 rises upward such that hooked end 112 of the DIN clip arm 108 no longer engages the second side 115 of the DIN rail 104.

Thus, it can be seen that the fuse holder 106, the housing 107 thereof, and DIN clip 100 are configured such that moving the fuse holder 106 and DIN clip 100 in a first direction may cause the knob-like feature 118 to move within the second slot 130 and raise the DIN clip arm 108 into the unlocked position in which the DIN clip arm 108 does not engage the DIN rail 104. In a further embodiment, the first direction is perpendicular to a length of the DIN rail 104, and horizontal with respect to a mounting surface of the DIN rail 104. In this context, the mounting surface is the flat bottom part of the DIN rail 104 which is attached to a surface, such as the interior of a fuse panel.

Continuing with this example, moving the fuse holder 106, the housing 107 thereof, and DIN clip 100 in a second direction opposite the first direction causes the knob-like feature 118 to move within the second slot 130 and lower the DIN clip arm 108 into the locked position in which the DIN clip arm 108 engages and latches onto the DIN rail 104. In this embodiments, the second direction is perpendicular to a length of the DIN rail 104 and horizontal with respect to a mounting surface of the DIN rail 104.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus configured for mounting onto a DIN rail, the apparatus comprising:
    a housing in which electrical or mechanical components are disposed, the housing having a bottom edge which abuts the DIN rail when the apparatus is mounted thereon;
    a DIN clip attached to the bottom edge of the housing, the DIN clip comprising:
        a DIN clip body configured to be disposed to a first side of a DIN rail, the DIN clip body having a first end which is closest to the first side of the DIN rail, and a second end which is farthest from the first side of the DIN rail; and
        a DIN clip arm pivotally attached to the first end of the DIN clip body, the DIN clip arm configured to span the width of the DIN rail and to pivotally transition between locked and unlocked positions, wherein the DIN clip arm is configured to attach to a second side of the DIN rail opposite the first side, when in the locked position;
    wherein the housing includes a first slot, the DIN clip body being disposed within the first slot and designed to move back and forth within the first slot between a locked position and an unlocked position; and
    wherein the first slot includes a first projection configured to engage a second projection on a surface of the DIN clip body when the DIN clip body moves back and forth within the first slot between the locked position and unlocked positions.

2. The apparatus of claim 1, wherein a first end of the DIN clip arm is pivotally attached to the first end of the DIN clip body, and a second end of the DIN clip arm is hook-shaped.

3. The apparatus of claim 2, wherein the second end of the DIN clip arm is configured to latch onto the second side of the DIN rail.

4. The apparatus of claim 3, wherein the hook-shaped portion of the DIN clip arm is configured to partially surround a flange on the second side of the DIN rail.

5. The apparatus of claim 1, wherein the first slot is located in a portion of the housing that depends from the bottom edge.

6. The apparatus of claim 1, wherein the housing includes an angled slot, the DIN clip body being disposed within a first slot located in a portion of the housing that depends from the bottom edge, and being designed to move back and forth within the first slot between a locked position and an unlocked position.

7. The apparatus of claim 6, wherein the DIN clip arm includes a knob-like feature configured to move back and forth within an angled slot in the housing of the apparatus.

8. The apparatus of claim 7, wherein moving the housing in a first direction causes the knob-like feature to move within the angled slot and raise the DIN clip arm into the unlocked position in which the DIN clip arm does not engage the DIN rail.

9. The apparatus of claim 8, wherein the first direction is perpendicular to a length of the DIN rail and horizontal with respect to a mounting surface of the DIN rail.

10. The apparatus of claim 8, wherein moving the housing in a second direction opposite the first direction causes the knob-like feature to move within the angled slot and lower the DIN clip arm into the locked position in which the DIN clip arm engages the DIN rail.

11. The apparatus of claim 10, wherein the second direction is perpendicular to a length of the DIN rail and horizontal with respect to a mounting surface of the DIN rail.

12. The apparatus of claim 1, wherein the apparatus is a fuse holder.

13. A DIN clip comprising:
    a DIN clip body configured to be disposed to a first side of a DIN rail, the DIN clip body having a first end which is closest to the first side of the DIN rail, and a second end which is farthest from the first side of the DIN rail; and
    a DIN clip arm pivotally attached to the first end of the DIN clip body, the DIN clip arm configured to span the width of the DIN rail and to pivotally transition between locked and unlocked positions, wherein the DIN clip arm is configured to attach to a second side of the DIN rail opposite the first side, when in the locked position;

wherein the DIN clip body includes a projection configured to engage a corresponding projection on a device to which the DIN clip is attached.

14. The DIN clip of claim 13, wherein a first end of the DIN clip arm is pivotally attached to the first end of the DIN clip body, and a second end of the DIN clip arm is hook-shaped.

15. The DIN clip of claim 14, wherein the second end of the DIN clip arm is configured to latch onto the second side of the DIN rail.

16. The DIN clip of claim 13, wherein the DIN clip arm includes a knob-like feature configured to move back and forth within a slot in a device to which the DIN clip is attached.

17. The DIN clip of claim 16, wherein the device is a fuse holder.

18. An apparatus configured for mounting onto a DIN rail, the apparatus comprising:
- a housing in which electrical or mechanical components are disposed, the housing having a bottom edge which abuts the DIN rail when the apparatus is mounted thereon;
- a DIN clip attached to the bottom edge of the housing, the DIN clip comprising:
  - a DIN clip body configured to be disposed to a first side of a DIN rail, the DIN clip body having a first end which is closest to the first side of the DIN rail, and a second end which is farthest from the first side of the DIN rail; and
  - a DIN clip arm pivotally attached to the first end of the DIN clip body, the DIN clip arm configured to span the width of the DIN rail and to pivotally transition between locked and unlocked positions, wherein the DIN clip arm is configured to attach to a second side of the DIN rail opposite the first side, when in the locked position;

wherein the housing includes an angled slot, the DIN clip body being disposed within a first slot located in a portion of the housing that depends from the bottom edge, and being designed to move back and forth within the first slot between a locked position and an unlocked position.

19. The apparatus of claim 18, wherein the DIN clip arm includes a knob-like feature configured to move back and forth within an angled slot in the housing.

20. The apparatus of claim 19, wherein the housing is configured such that moving the housing in a first direction causes the knob-like feature to move within the angled slot and raise the DIN clip arm into the unlocked position in which the DIN clip arm does not engage the DIN rail.

21. The apparatus of claim 20, wherein the first direction is perpendicular to a length of the DIN rail and horizontal with respect to a mounting surface of the DIN rail.

22. The apparatus of claim 20, wherein moving the housing in a second direction opposite the first direction causes the knob-like feature to move within the angled slot and lower the DIN clip arm into the locked position in which the DIN clip arm engages the DIN rail.

* * * * *